July 1, 1930.    L. C. COLE    1,768,664
RAPID TRAVERSE MECHANISM FOR LATHES
Filed April 2, 1928    2 Sheets-Sheet 1
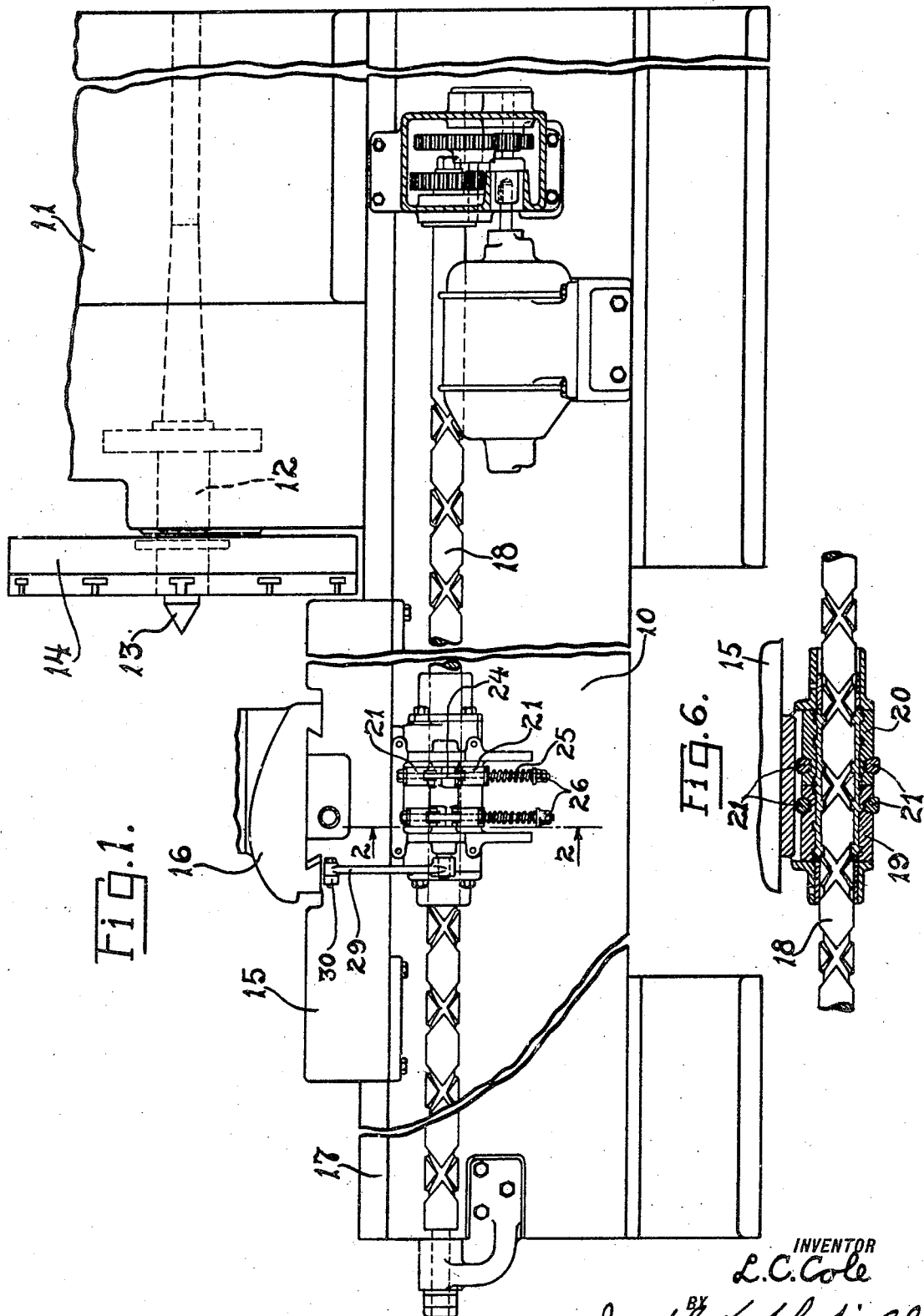
INVENTOR
L. C. Cole
BY
Joseph K. Schofield
ATTORNEY

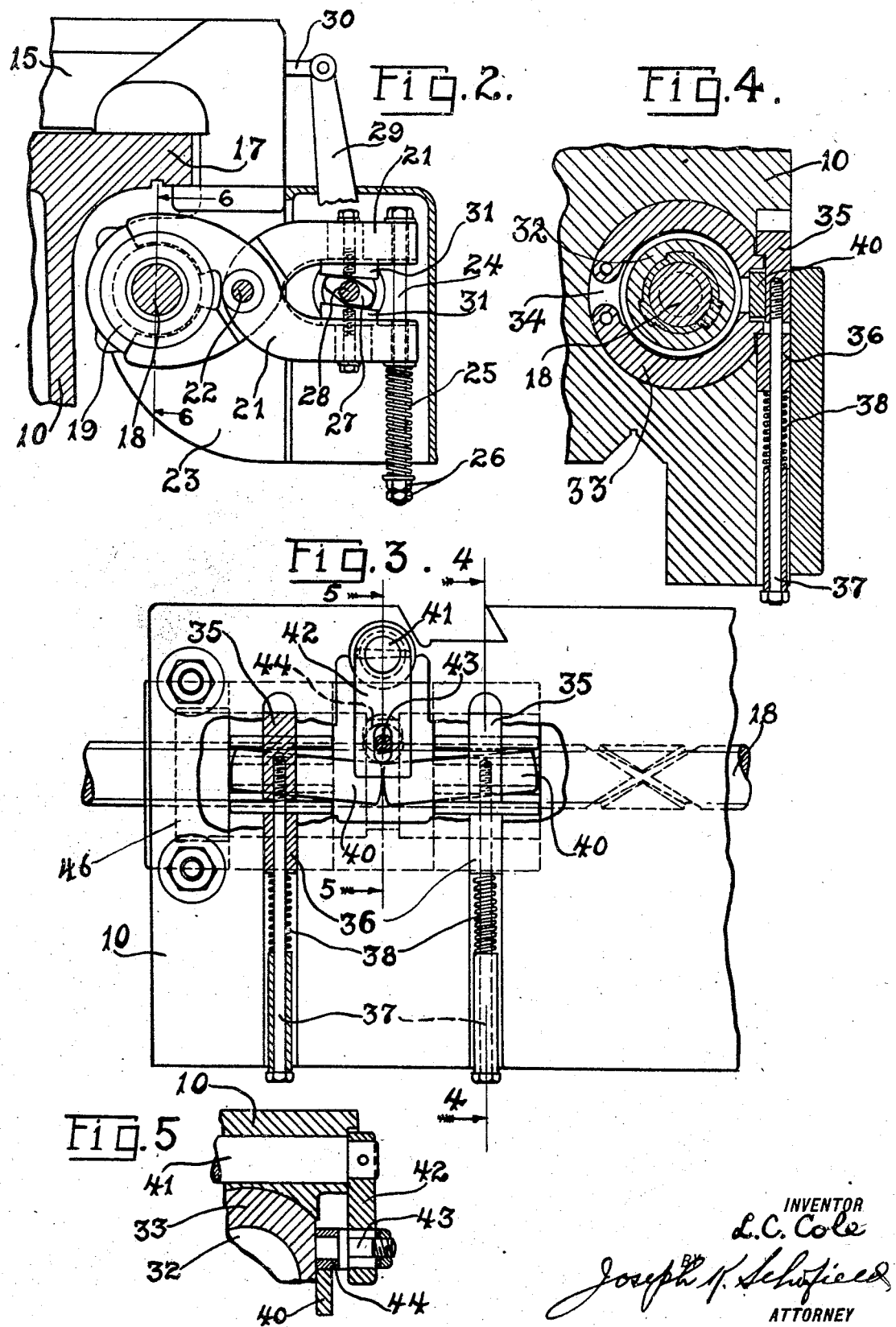

Patented July 1, 1930

1,768,664

UNITED STATES PATENT OFFICE

LYNDON C. COLE, OF HAMILTON, OHIO, ASSIGNOR, BY MESNE ASSIGNMENTS, TO GENERAL MACHINERY CORPORATION, OF HAMILTON, OHIO, A CORPORATION OF DELAWARE

RAPID TRAVERSE MECHANISM FOR LATHES

Application filed April 2, 1928. Serial No. 266,645.

This invention relates to rapid traversing mechanisms adapted to traverse a carriage longitudinally along the base of a lathe or other machine tool in either direction.

An object of the present invention is to provide an improved form of mechanism generally similar to that shown in application of C. H. Jensen, Serial No. 239,976, filed December 14, 1927.

Another object of the invention is to provide an improved form of resilient nut engaging means adapting either of a pair of nuts engaging a right and left hand thread-screw to be held against rotation, these means permitting a gradual application of force to control the movement of the carriage.

Another object of the invention is to provide frictional engaging members, preferably contacting with the periphery of individual nuts, and adapted to be normally forced into frictional engagement with the nut by spring means, cam means being provided to release engagement of the members from the nuts.

With these and other objects in view, my invention consists in the features of construction and operation set forth in the following specification and illustrated in the accompanying drawings.

In the accompanying drawings annexed hereto and forming a part of this specification, I have shown my invention embodied in traversing mechanism for a lathe of medium size, but it will be understood that the invention can be otherwise embodied and that the drawings are not to be construed as defining or limiting the scope of the invention, the claims appended to this specification being relied upon for that purpose.

In the drawings:

Figure 1 is a rear elevation of a lathe, parts being broken away to show the traversing mechanism upon a convenient scale.

Fig. 2 is a fragmentary cross sectional view upon line 2—2 of Fig. 1 showing the nut engaging members.

Fig. 3 is a rear elevation of a slightly modified form of the invention.

Fig. 4 is a transverse sectional view taken upon the line 4—4 of Fig. 3.

Fig. 5 is a detail view taken upon the line 5—5 of Fig. 3, and

Fig. 6 is a longitudinal sectional view through the nuts on the traversing screws.

In the above mentioned drawings I have shown two embodiments of the invention which are now deemed preferable, but it is to be understood that changes and modifications may be made within the scope of the appended claims without departing from the spirit of the invention.

As the present invention relates to an improved construction of certain details of the mechanism shown in the above referred to application, it is not thought that a complete description of the entire rapid traversing mechanism and its association with the feeding mechanism of the lathe requires description. It will suffice to state that the present invention is applicable to lathes or other machine tools having a carriage or support requiring relatively rapid movements in either direction and that the construction involves the use of a constantly rotating right and left hand screw of relatively long lead and a pair of nuts individually engaging the screw threads on the screw either of which may be held against rotation or permitted to rotate therewith.

Referring more in detail to the figures of the drawings, a lathe base is shown at 10 having a headstock 11 in which rotates a spindle 12 having a center 13 and face plate 14 as shown. The carriage 15 on which is mounted the tool support 16, shown fragmentarily, is movable in opposite directions along suitable ways 17 provided on the base 10. The usual means may be employed for rotating the spindle 12 and face plate 14 and for feeding the carriage 15 and tool support 16 during cutting operations in either direction. These means may be as shown in the copending application.

In order to traverse the carriage 15 at a relatively high speed in opposite directions, a screw 18 is rotatably mounted upon the rear vertical surface of the base 10 and is adapted to be rotated by any convenient means. The screw 18 is provided as shown with two screw threads of opposite helix.

Adapted to engage the screw threads, which are of right and left hand respectively, on this screw 18 are nuts 19 and 20. One of these nuts engages the left hand thread and the other the right hand thread. When one of these nuts 19 or 20 is held against rotation and while the screw 18 is being rotated continuously the carriage 15 will be advanced along the base 10, depending upon which nut is restrained. The opposite nut rotatable upon the screw 18 is adapted to be forced along the opposite screw thread due to the long lead and therefore large helix angle of the threads on the screw.

In order to individually stop rotation of either of the nuts 19 or 20 with the screw 18 by simple mechanism and with a gradually increasing pressure, the mechanism forming the present invention has been devised. This, in one of its embodiments, comprises a pair of levers 21 oppositely disposed, which are pivoted at 22 to a bracket 23 on the carriage 15 substantially at the mid portion of the levers 21. The forwardly extending portions of each lever 21 partially enclose one of the nuts 19 or 20 which may be provided with a peripheral groove similar to that shown in the above mentioned copending application. The rear ends of the levers 21 are adapted to be resiliently forced together by means of a rod 24 passing through the levers 21 and having a spring 25 interposed between the nuts 26 on one end and the outer face of one of the levers 21. By means of this spring 25 the levers 21 are held in a position so that their forward ends resiliently and tightly engage the walls of the peripheral groove in the nut 19 or 20. In order to actuate the levers 21 against the pressure of the spring 25 to disengage the forward ends of the levers 21 from the nut 19 or 20, a small cam 27 may be used for each pair of levers, as shown in Fig. 2. These are formed on a short cam shaft 28 rotatably mounted in the bracket 23 and adapted to be oscillated by a lever 29 thereon moved by a forwardly extending rod 30.

The cam portions of the cams 27, one only of which is shown in Fig. 2, engage small plates 31 attached as shown to the levers 21. It will be understood that there is a pair of levers 21, spring 25 and cam 27 for each of the nuts 19 and 20 and that the cams 27 are so disposed on their shaft 28 that oscillation of the lever 29 in one direction will cause one cam 27 to disengage levers 21 from one of the nuts 19 or 20 and movement in the other direction will cause other lever 21 to disengage the opposite nut. At no time, due to the form of cams 27 and their position on cam shaft, can both nuts 19 and 20 be engaged by their levers 21. During feeding movements of the carriage 11 both pairs of levers 21 are in positions out of contact with the nuts 19 and 20.

In the modification of the invention shown in Figs. 3, 4 and 5, the nuts 32 are shown as being of the same type as those in Fig. 2 or in the copending application. They do not, however, have the peripheral groove of the form shown in Fig. 2. Instead arcuate members 33 directly engage their outer cylindrical surfaces. Two of these members 33 are provided for each nut 32 pivotally mounted to a connecting link 34 at one end and adapted to be forced into engaging contact with the nut 32 by means of members 35 and 36 adapted to be forced together by a rod 37 and spring 38. The spring 38 normally holds the pivotally mounted members 33 resiliently in contact with its nut 32 and in order to move these pivoted members 33 so that they will be disengaged from the nuts 32, a lever or bar 40 is provided for each nut adapted to engage portions of the pivotally mounted members 33 suitably recessed to form shoulders against which the bars can engage. This member 40, as shown in Figs. 3 and 4, is a short bar extending beyond the nut, the two nuts having similar bars extending in opposite directions so that their inner ends are adapted to be closely adjacent. The outer ends of these bars 40 engage collars 46 so that they are retained properly in position.

With the parts in position as shown in Fig. 3, the bars 40 are both maintained in oblique position, which causes the members 33 surrounding each of the nuts 32 to be held away from their peripheries, thus allowing the nuts to rotate with the screw 18. If, however, one of these bars 40 is permitted to move toward a horizontal position, the spring 38 will force the pivoted members 33 together and therefore stop rotation of that nut 32 relative to the carriage 15.

In order to effect movement of these bars 40 individually, an oscillating shaft 41 extending forwardly through the carriage 15 to a position adapted to be manually controlled by the operator is provided with a downwardly extending arm 42 on which is mounted a stud 43 carrying a roller 44. This roller 44 rides upon the upper surfaces of adjacent ends of the members 40 which engage the members 33 and by movement to an oblique position permits one or the other of the bars 40 to assume a more nearly horizontal position and thus permit the spring 38 to force the pivoted members 33 frictionally into engagement with the nuts 32. This gradually stops rotation of one of the nuts 32 and, due to the rotation of the shaft 18 with one of its screw threads, advances the carriage 15 along the base 10.

What I claim is:

1. A rapid traverse mechanism for lathes comprising in combination, a base, a carriage, movable thereon, a right and left hand threaded screw, a pair of nuts carried by said carriage engaging respectively the screw threads on said screw, a separate spring actuated means for each nut frictionally engaging said nuts, and cam means to prevent simultaneous engagement of said frictional means with the nuts and to individually disengage and free said frictional means from said nuts.

2. A rapid traverse mechanism for lathes comprising in combination, a base, a carriage movable thereon, a right and left hand threaded screw, a pair of nuts carried by said carriage engaging respectively the screw threads on said screw, two part members frictionally engaging and partially surrounding said nuts, springs normally holding said members toward each other and in contact with said nuts, and means to individually disengage said frictional members from said nuts.

3. A rapid traverse mechanism for lathes comprising in combination, a base, a carriage movable thereon, a right and left hand threaded screw, a pair of nuts carried by said carriage engaging respectively the screw threads on said screw, individual semi-circular spring actuated members frictionally engaging the periphery of said nuts, spring means normally forcing said members together and into contact with said nuts, and means permitting individual engagement of said frictional members with said nuts.

4. A rapid traverse mechanism for lathes comprising in combination, a base, a carriage movable thereon, a right and left hand threaded screw, a pair of nuts carried by said carriage engaging respectively the screw threads on said screw, oppositely disposed individual members frictionally engaging and partially surrounding said nuts, spring means normally holding said members in engagement with said nuts, means to individually disengage said frictional members from said nuts, and manual means permitting either of said means to engage its nut.

5. A rapid traverse mechanism for lathes comprising in combination, a base, a carriage movable thereon, a right and left hand threaded screw, a pair of nuts carried by said carriage engaging respectively the screw threads on said screw, spring actuated means frictionally engaging said nuts, individual cams to disengage said frictional means from said nuts, and means to operate said cams to permit engagement of said means with one of said nuts.

6. A rapid traverse mechanism for lathes comprising in combination, a base, a carriage movable thereon, a right and left hand threaded screw, a pair of nuts carried by said carriage engaging respectively the screw threads on said screw, members surrounding said nuts, spring means normally holding said members in contact with said nuts, means to disengage said members from their respective nuts, and means to permit said spring means to force said means surrounding said nuts to engage one of said nuts, said means also movable to force both said members from said nuts.

In testimony whereof, I hereto affix my signature.

LYNDON C. COLE.